US009725055B2

(12) United States Patent
Gonzalez, Jr. et al.

(10) Patent No.: US 9,725,055 B2
(45) Date of Patent: Aug. 8, 2017

(54) RESERVE POWER SYSTEM FOR A POWER CONSUMPTION DEVICE IN AN INTERNAL COMBUSTION ENGINE SYSTEM

(71) Applicant: Cummins IP, Inc., Columbus, IN (US)

(72) Inventors: Miguel A. Gonzalez, Jr., Columbus, IN (US); Daniel R. Harshbarger, Columbus, IN (US); Thomas J. Milvert, Columbus, IN (US); William D. Meyer, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 563 days.

(21) Appl. No.: 14/060,825

(22) Filed: Oct. 23, 2013

(65) Prior Publication Data
US 2015/0108831 A1   Apr. 23, 2015

(51) Int. Cl.
*B60R 16/033*   (2006.01)

(52) U.S. Cl.
CPC ................. *B60R 16/033* (2013.01)

(58) Field of Classification Search
CPC .................................... B60R 16/033
USPC ........................................ 307/9, 9.1
See application file for complete search history.

(56) References Cited

U.S. PATENT DOCUMENTS

| | | | | |
|---|---|---|---|---|
| 5,318,142 A * | 6/1994 | Bates | ........................ | B60K 6/28 180/65.245 |
| 6,016,045 A | 1/2000 | Thomas et al. | | |
| 6,016,049 A * | 1/2000 | Baughman | ............... | F16H 61/32 320/167 |
| 6,888,267 B2 | 5/2005 | Floro et al. | | |
| 7,806,095 B2 * | 10/2010 | Cook | ................... | F02N 11/0866 123/179.3 |
| 8,001,419 B2 | 8/2011 | Killian et al. | | |
| 8,207,633 B2 | 6/2012 | Oleksiewicz | | |
| 8,773,064 B2 * | 7/2014 | Kim | ...................... | B60R 16/033 320/104 |
| 9,254,799 B2 * | 2/2016 | Yoshida | ................ | B60R 16/033 |
| 2006/0250902 A1 * | 11/2006 | Bender | .................... | B60K 6/46 369/1 |
| 2007/0068714 A1 * | 3/2007 | Bender | .................... | B60K 6/28 180/65.29 |

(Continued)

FOREIGN PATENT DOCUMENTS

JP   2010-016955 A   1/2010

OTHER PUBLICATIONS

Garthwaite, J., How ultracapacitors work (and why they fall short); Tech News and Analysis, Jul. 12, 2011, retrieved from the internet at http://gigaom.com/2011/07/12/how-ultracapacitors-work-and-why-they-fall-short on Jan. 30, 2014, 10 pages.

(Continued)

*Primary Examiner* — Jared Fureman
*Assistant Examiner* — Michael Warmflash
(74) *Attorney, Agent, or Firm* — Foley & Lardner LLP (57) ABSTRACT

According to one embodiment, an electrical power management system for an internal combustion engine system with a power consumption device includes a battery and a supercapacitor. The battery is coupleable in electrical power providing communication with the power consumption device. The supercapacitor is coupleable in electrical power providing communication with the power consumption device.

16 Claims, 3 Drawing Sheets

(56) References Cited

U.S. PATENT DOCUMENTS

| | | | |
|---|---|---|---|
| 2009/0096285 A1* | 4/2009 | Acena | B60L 11/005 307/10.1 |
| 2011/0115288 A1* | 5/2011 | Lee | B60K 6/485 307/10.1 |
| 2011/0210605 A1 | 9/2011 | Duan et al. | |
| 2012/0237799 A1* | 9/2012 | Jiang | H01M 2/1072 429/7 |
| 2013/0264869 A1* | 10/2013 | Klinkig | B60R 16/03 307/10.6 |

OTHER PUBLICATIONS

Maxwell Technologies, Ultracapacitors Back-up Power; retrieved from the internet at: www.maxwell.com/products/ultracapacitors/applications/backup-power, on Jan. 30, 2014, 2 pages.

Maxwell Technologies, Ultracapacitors Cold Starting Solutions; retrieved from the internet at: www.maxwell.com/products/ultracapacitors/applications/cold-starting, on Jan. 30, 2014, 2 pages.

Maxwell Technologies, Ultracapacitors Regenerative Power Solutions; retrieved from the internet at: www.maxwell.com/products/ultracapacitors/applications/regenerative-power, on Jan. 30, 2014.

Parallel Plate Capacitor, Georgia State University, Oct. 23, 2013, retrieved from the internet at: hyperphysics.phy-astr.gsu.edu, 2 pages.

Jiminex et al., Porosity and surface area of monolithic carbon aerogels prepared using alkaline carbonates and organic acids as polymerization catalysts, Carbon, Sep. 2006, vol. 44, Issue 11, Elsevier Ltd., pp. 2301-2307.

Halper et al., Supercapacitors: A Brief Overview, MITRE Nanosystems Group, Mar. 2006, MITRE Corporation, McLean, VA, 41 pages.

Buchmann, Supercapacitors coexist with batteries, not compete, Canadian Electronics, Nov. 22, 2011, retrieved from the internet at: http://www.canadianelectronics.ca/blogs/supercapacitors-coexist-with-batteries-not-compete, on Jan. 30, 2014, 4 pages.

Bush, Supercapacitors see growth as costs fall, Electronics Weekly, Mar. 1, 2006, retrieved from the internet at: www.electronicsweekly.com/news/components/passives/supercapacitors-see-growth-as-costs-fall-2006-03/, on Oct. 23, 2013, 3 pages.

Amanogawa, Transmission Line Equations, 2006, Digital Maestro Series, 26 pages.

Image of Activated Carbon, retrieved from the internet at: http://upload.wikimedia.org/wikipedia/commons/3/30/Activated-carbon.jpg, on Feb. 28, 2014.

* cited by examiner

RESERVE POWER SYSTEM FOR A POWER CONSUMPTION DEVICE IN AN INTERNAL COMBUSTION ENGINE SYSTEM

FIELD

This disclosure relates generally to internal combustion engine systems, and more particularly to providing reserve power to an internal combustion engine system using a supercapacitor.

BACKGROUND

Modern internal combustion engines are controlled by an engine control module (ECM). Generally, the ECM controls the operation of the internal combustion engine, as well various sub-systems operatively coupled to the internal combustion engine. The ECM can receive multiple inputs, process the inputs, and transmit multiple outputs. The outputs are received by one or more components of the internal combustion engine and associated systems, which respond in accordance to the received outputs to achieve desired results.

The ECM is powered by an electrical power source. Often, the internal combustion engine forms part of a vehicle and the electrical power source is a battery of the vehicle. Under some circumstances, power from the vehicle battery to the ECM may be either temporarily or permanently disrupted. For example, some internal combustion engines are equipped with a battery disconnect switch (e.g., kill switch) that can be actuated by a user to prevent the flow of power from the vehicle battery to the ECM. Additionally, some operations of an engine may degrade the performance of the vehicle battery such that the ability of the battery to deliver power to the ECM is limited or lost. As an example, the high current needs of a starter motor of the engine during a cranking operation of the engine may significantly drain power from the battery.

Disruption of power to the ECM can cause the ECM to reset, which may lead to lost data, damaged data, and disabling of one or more of the components of the internal combustion engine. Because data stored on the ECM may be required for necessary operations of the engine, such as the storage and transfer of signals and messages, as well as for servicing and warranty needs, preservation of the data management and engine control functionality of the ECM is important.

SUMMARY

The subject matter of the present application has been developed in response to the present state of the art, and in particular, in response to the problems and needs in the art that have not yet been fully solved by currently available electrical power management systems for internal combustion engines. For example, some currently available electrical power management systems provide back-up power batteries that are used to power components of an internal combustion engine when a dedicated vehicle battery fails or inadequately provides power to the components. Unfortunately, back-up power batteries are complex, bulky, and require robust harnesses to support the batteries in a vehicle. Because space within a vehicle is limited, the back-up batteries of conventional engine systems are undesirable. Additionally, back-up batteries fail to provide quick bursts of energy required by some engine components. Accordingly, the subject matter of the present application has been developed to provide methods, systems, and apparatus for managing electrical power in an internal combustion engine system that overcomes at least some shortcomings of the prior art.

According to one embodiment, an electrical power management system for an internal combustion engine system with a power consumption device includes a battery and a supercapacitor. The battery can be coupled to the power consumption device to provide electrical power to the power consumption device. The supercapacitor can be coupled in electrical power providing communication with the power consumption device.

In some implementations, the electrical power management system further includes a power arbitration module that receives electrical power from the battery and the supercapacitor. The power arbitration module also provides electrical power to the power consumption device. Additionally, the power arbitration module can be configured to selectively provide electrical power to the power consumption device from one or both of the battery and supercapacitor. The power arbitration module may selectively provide electrical power to the power consumption device from only the supercapacitor based on a condition of the battery. According to some implementations, the electrical power management system also includes a battery disconnect switch, where the power arbitration module selectively provides electrical power to the power consumption device from only the supercapacitor when the battery disconnect switch is activated. The power arbitration module can selectively provide electrical power to the power consumption device from only the supercapacitor during an engine cranking event of the internal combustion engine. Further, the power arbitration module may selectively provide electrical power to the power consumption device from both the battery and the supercapacitor during an engine cranking event of the internal combustion engine.

According to certain implementations, the electrical power management system includes a recharger that selectively provides electrical power to the supercapacitor. The recharger can be separate from the battery.

In some implementations of the electrical power management system, the power consumption device is an engine control module. The electrical power management system can further include a switch module that receives power from the supercapacitor and a power condition module that receives power from the battery. The switch module is configured to selectively transmit power from the supercapacitor to the engine control module based on a condition of the battery determined by the power condition module. The power condition module can be configured to selectively transmit power from the battery to the engine control module.

In yet certain implementations of the electrical power management system, the battery is non-selectively coupled in electrical power providing communication with the power consumption device, and the supercapacitor is selectively coupled in electrical power providing communication with the power consumption device. The power consumption device can be a starter motor. The supercapacitor can be selectively coupled in electrical power providing communication with the starter motor during an engine cranking event of the internal combustion engine.

According to some implementations of the electrical power management system, the battery and supercapacitor are in parallel. In yet some implementations, the battery is not in electrical power receiving communication with another component of the internal combustion engine system.

According to another embodiment, an internal combustion engine system includes an internal combustion engine and a power consumption device coupled to the internal combustion engine. The engine system also includes a battery that is selectively or non-selectively electrically coupled to the power consumption device. Additionally, the engine system includes a supercapacitor that is selectively electrically coupled to the power consumption device. The supercapacitor is in parallel with the battery.

In some implementations, the internal combustion engine system further includes a switch module. The supercapacitor is selectively electrically coupled to the power consumption device via the switch module. The switch module electrically couples the supercapacitor to the power consumption device during a power loss event and electrically decouples the supercapacitor from the power consumption device when a power loss event is not occurring.

According to some implementations, the internal combustion engine system also includes an arbitration module. The battery and supercapacitor are selectively electrically coupled to the power consumption device via the arbitration module. In one implementation, the arbitration module selectively electrically couples the battery, supercapacitor, or both in electrical power providing communication with the power consumption device based on predetermined data.

In yet another embodiment, a method for managing the electrical power within an internal combustion engine system includes providing electrical power to a power consumption device of the internal combustion engine system via a battery. The method also includes selectively providing electrical power to the power consumption device of the internal combustion engine system via a supercapacitor in parallel with the battery.

According to certain implementations, the method further includes selectively switching between providing electrical power to the power consumption device of the internal combustion engine system via the battery and providing electrical power to the power consumption device of the internal combustion engine system via the supercapacitor based on an operating condition of the internal combustion engine system.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
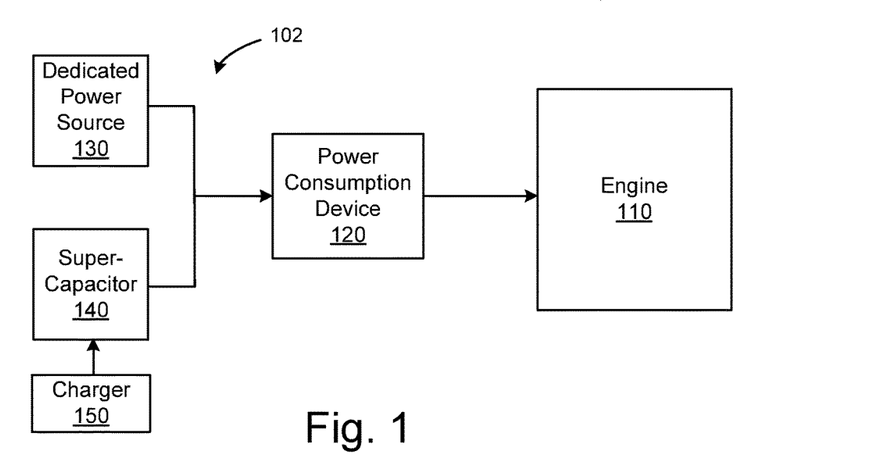
FIG. 1 is a schematic block diagram of an internal combustion engine system having an internal combustion engine and an electrical power management system with a supercapacitor in accordance with one representative embodiment.

FIG. 1 depicts one embodiment of an internal combustion engine system 100. The main components of the engine system 100 include an internal combustion engine 110 and a power consumption device 120. The internal combustion engine 110 can be a compression-ignited internal combustion engine, such as a diesel fueled engine, or a spark-ignited internal combustion engine, such as a gasoline fueled engine. The power consumption device 120 can be any of various devices that consume electrical power or require electrical power for operation. Further, the power consumption device 120 can be directly or indirectly coupled to the engine to electronically, electrically, mechanically, or otherwise control operation of the engine.

In one embodiment, the power consumption device 120 is an engine control module (ECM). As described above, electrical power received by the ECM is utilized to electronically control the operation of the internal combustion engine, as well various sub-systems operatively coupled to the internal combustion engine. The ECM can receive multiple electronic inputs, process the inputs, and transmit multiple outputs. The outputs are received by one or more components of the internal combustion engine and associated systems, which respond in accordance to the received outputs to achieve desired results.

In yet some embodiments, the power consumption device 120 is a starter motor used to mechanically crank (e.g., rotate) the engine 110 during a start-up of the engine. Electrical power received by the starter motor is converted into mechanical power to crank a driveshaft of the engine via a flywheel or other power transfer mechanism. The starter motor can be any of various types of electric motors known in the art. During the start-up of the engine, the starter motor consumes a significant amount of electrical power in order to crank the driveshaft.

The power consumption device 120 can be any of various other devices or systems of an internal combustion engine system 100 or associated vehicle that consume electrical power during operation of the system. For example, in some implementations, the power consumption device 120 may be an auxiliary system of a vehicle, such as a vehicle electronics system (e.g., radio, dash displays, power windows/seats, etc.), external head and tail lamp system, A/C system, and the like.

Electrical power can be supplied to the power consumption device 120 from a dedicated power source 130 in electrical power providing communication with the power consumption device via one or more electrical transmission lines. The dedicated power source 130 forms part of an electrical power management system 102 of the engine system 100. The dedicated power source 130 can be an automotive rechargeable battery that is recharged during operation of the engine system 100 by an alternator or similar power generator. Although not shown, the dedicated power source 130 may be a battery coupled to the engine system 100 via a harness or mount, which can be bulky and heavy in some cases. Due to the bulk and weight associated with automotive batteries and the harnesses required for such batteries, in certain implementations, the power management system 102 does not include auxiliary batteries for recharging the battery. In this manner, space normally reserved for auxiliary batteries dedicated solely for recharging main batteries, and the associated harnesses required to mount the batteries to the engine system, is available for other components of the engine system 100. Moreover, weight savings is achieved without the added weight from such auxiliary batteries and associated harnesses.

It is recognized that in some implementations, the dedicated power source 130 may include two or more batteries in parallel. Although multiple batteries may be used in combination to provide power to the power consumption device, in certain implementations, no one battery is used to recharge another battery.

According to some implementations, the power consumption device 120 may require a steady, smaller amount of electrical power during operation, such as with an ECM. In yet some implementations, the power consumption device 120 may require frequent or infrequent pulses of large amounts of energy, such as with a starter motor. The dedicated power source 130 should be capable of storing and supplying enough electrical power to accommodate such electrical power demands.

Under certain operating conditions, which include electrical power demands at any given time, the power storage condition of the battery, and/or the activation of electrical power kill switches, the dedicated power source 130 may be incapable of storing and supplying an adequate level or duration of electrical power to meet the demands of the power consumption device 120. Accordingly, the electrical power management system 102 of the engine system 100 includes a supercapacitor 140 that is communicable in electrical power providing communication with the power consumption device 120 via one or more electrical transmission lines. The supercapacitor 140 is in parallel with the dedicated power source 130. In some implementations, electrical power is supplied to the power consumption device 120 from both the dedicated power source 130 and the supercapacitor 140. For example, power from the supercapacitor 140 can be combined with power from the dedicated power source 130 to electrically power the power consumption device 120. However, in other embodiments, such as when the dedicated power source 130 is unable to supply power to the power consumption device 120, the supercapacitor 140 is utilized to supply power to the power consumption device in place of the dedicated power source. In such embodiments, electrical power supply to the power consumption device 120 can be switched between the dedicated power source 130 and the supercapacitor 140.

The supercapacitor 140 can be any of various supercapacitors known in the art. As defined herein, the supercapacitor 140 can be considered an ultracapacitor, electric double-layer capacitor, pseudocapacitor, or hybrid capacitor. Generally, the supercapacitor 140 is an electrochemical capacitor or energy storage component that stores electrical energy using a certain electrochemical construction. The supercapacitor 140 may have one or more capacitive cells each of which includes two collectors, two electrodes, a separator, and an electrolyte. The electrodes are made from materials having a relatively high surface area compared to conventional capacitors and the electrolytes are made from relative thin electrolytic dielectrics compared to conventional capacitors. This electrochemical construction allows the supercapacitor 140 to achieve capacitances that are several orders of magnitude higher than conventional capacitors. Additionally, supercapacitors provide much higher energy densities compared to conventional capacitors and much higher power densities than electrochemical batteries, such as the dedicated power source 130. Accordingly, the size of the supercapacitor 140 can be significantly smaller than a conventional automotive battery, yet provide even more power output than the battery. Moreover, supercapacitors take less time to charge/discharge, and have longer life cycles with negligible degradation, on the order of one million life cycles, compared to electrochemical batteries. Therefore, the supercapacitor 140 acts as a power source for the power consumption device 120, and may provide both the steady, smaller amount of electrical power during operation, as well as the pulses of large amounts of energy. Additionally, supercapacitors can provide a higher percentage of their charge at low temperatures compared to batteries.

In some implementations, the supercapacitor 140 can be two or more supercapacitors individually or collectively electrically coupled with the power consumption device 120. Multiple supercapacitors may be electrically coupled together in series or in parallel. Additionally, in some implementations, power output from a group of multiple supercapacitors can be selectively switched between individual supercapacitors of the group as desired.

The electrical power management system 102 includes a charger 150 in electrical power providing communication with the supercapacitor 140. The charger 150 can be the dedicated power source 130 or a dedicated charging device, such as an alternator. In some implementations, the charger 150 can be an auxiliary battery. The charger 150 is configured to recharge the supercapacitor 140 after the supercapacitor has lost a threshold amount of electrical power to the power consumption device 120, or the electrical power stored by the supercapacitor 150 has reached a minimum threshold amount of stored electrical power.

Figure 2:
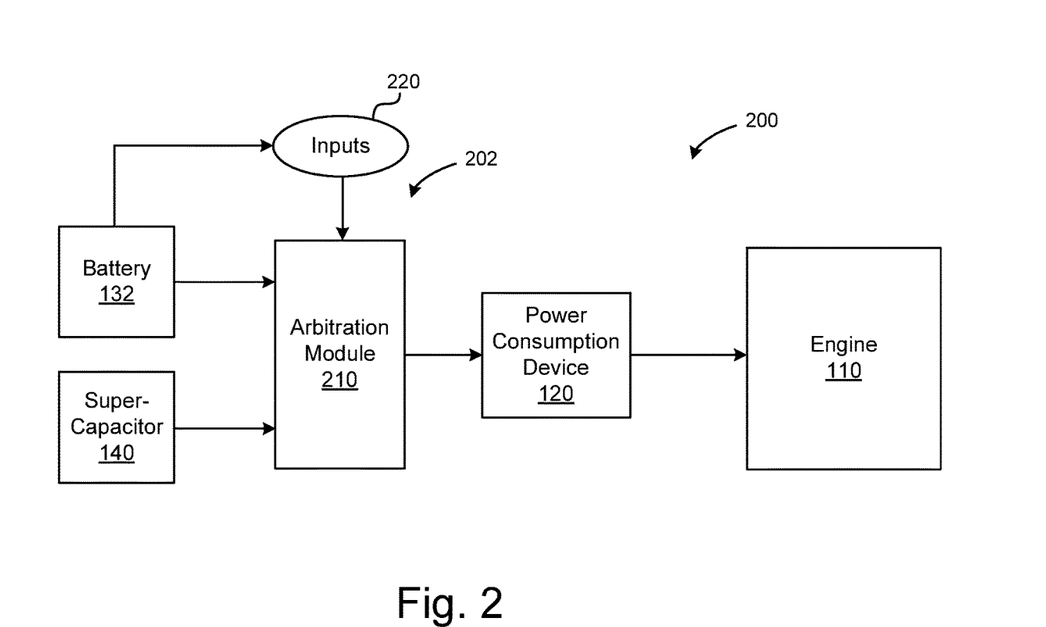
FIG. 2 is a schematic block diagram of an internal combustion engine system having an internal combustion engine and an electrical power management system with a supercapacitor and an arbitration module in accordance with another embodiment.

According to another embodiment shown in FIG. 2, an internal combustion engine system 200 includes an engine 110, a power consumption device 120, and an electrical power management system 202. The electrical power management system 202 manages the delivery of electrical power to the power consumption device 120. Electrical power is supplied to the power consumption device 120 from at least one power source as determined by an arbitration module 210 based on one or more inputs 220. The power source includes a battery 132, which can be an automotive battery, and one or more supercapacitors 140. The battery 132 and supercapacitor 140 are independently electrically coupled to respective electrical switches of the arbitration module 210. The arbitration module 210 includes logic that when executed controls the actuation of the switches and, correspondingly, the distribution of electrical power from the battery 132, supercapacitor 140, or both to the power consumption device 120. The logic may include predetermined data, such as look-up tables, against which one or more of the inputs 220 may be compared. Based on the comparison, the arbitration module 210 selectively actuates one or both of the switches to electrically couple the battery 132, supercapacitor 140, or both in power providing communication with the power consumption device 120. In some implementations, because the battery can be a dedicated power source, such as a conventional automotive battery, the arbitration module 210 may be configured generally to maintain closed (e.g., non-selectively close) the electrical circuit between the battery 132 and the power consumption device 120, and selectively close the electrical circuit between the supercapacitor 140 and the power consumption device as needed. Based on the foregoing, the supercapacitor 140 acts as a backup or reserve power source to supplement or replace the power provided by the battery 132 based on the inputs 220.

In one embodiment, the input 220 is a condition or power storage capability of the battery 132. The condition of the battery 132 may be based on a physical or virtual sensor that detects one or more characteristics of the battery. As the condition of the battery 132 degrades beyond a threshold level, the arbitration module 210 may be configured to close the physical switch between the supercapacitor 140 and the power consumption device 120, which facilitates the flow of electrical power from the supercapacitor to the power consumption device. Additionally, as the condition of the battery 132 degrades beyond a threshold level, the arbitration module 210 may be configured to open or maintain closed the physical switch between the battery 132 and the power consumption device 120, which prevents or maintains the flow of electrical power from the battery to the power consumption device.

According to another embodiment, the input 220 is an operating condition of the engine system 200, such as an engine start-up or cranking event. When the input 220 indicates the initiation of an engine start-up event, the arbitration module 210 may close the physical switch between the supercapacitor 140 and the power consumption device 120, which allows the flow of electrical power from the supercapacitor to the power consumption device. Additionally, when the input 220 indicates the initiation of an engine start-up event, the arbitration module 210 may open or maintain closed the physical switch between the battery 132 and the power consumption device 120.

Furthermore, according to yet another embodiment, the input 220 is the status of a battery disconnect switch (e.g., electrical power kill switch) that when activated cuts off power to the power consumption device 120 from the battery 132. When the input 220 indicates the battery disconnect switch has been activated, the arbitration module 210 may close the physical switch between the supercapacitor 140 and the power consumption device 120, which allows the flow of electrical power from the supercapacitor to the power consumption device.

Figure 3:
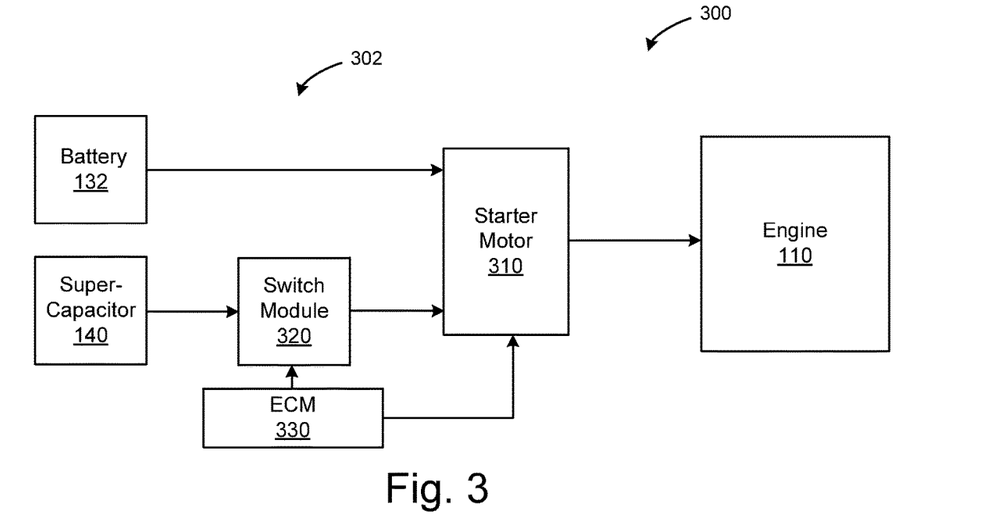
FIG. 3 is a schematic block diagram of an internal combustion engine system having an internal combustion engine and an electrical power management system with a supercapacitor and switch module in accordance with yet another embodiment.

Referring to FIG. 3, according to one embodiment, an internal combustion engine system 300 includes an engine 110, a starter motor 310, and an electrical power management system 302. The electrical power management system 302 manages the delivery of electrical power to the starter motor 310. Electrical power is non-selectively supplied to the starter motor 310 from a battery 132 of the system 302. In other words, the battery 132 of the system 302 acts as a dedicated electrical power source for the starter motor 310 to provide electrical power to the starter motor 310, independently of a supercapacitor 140 of the system 302, when demanded by the starter motor 310. The supercapacitor 140 is electrically coupled with a switch module 320 of the electrical power management system 302. The switch module 320 includes a physical switch.

The switch module 320 is operable to actuate the physical switch to close an electrical circuit and allow electrical power providing communication between the supercapacitor 140 and the starter motor 310. In some implementations, the switch module 320 actuates the physical switch based on input from an ECM 330 of the internal combustion engine system 300. The ECM 330 controls operations of the engine system 330, such as the activation of the starter motor 310 during an engine start-up or cranking event. Additionally, the ECM 330 is configured to control the switch module 320 to close the electrical circuit between the supercapacitor 140 and the starter motor 310 in cooperation with activating the starter motor 310. In this manner, the ECM 330 controls the switch module 320 to provide electrical power from the supercapacitor 140 to the starter motor 310 to power the starter motor 310 during an engine start-up event. In certain implementations, the ECM 330 controls the switch module 320 to provide electrical power from the supercapacitor 140 to the starter motor 310 to power the starter motor 310 during an engine start-up event regardless of the condition of the battery 132. Accordingly, the electrical power management system 302 is operable to supplement the electrical powering needs of the starter motor 310 with power from the supercapacitor 140. Providing electrical power from the supercapacitor 140 in this manner also allows a developer or manufacturer of the engine system to select a smaller battery 132, as the battery is typically sized to provide the required power at low operating temperatures.

Figure 4:
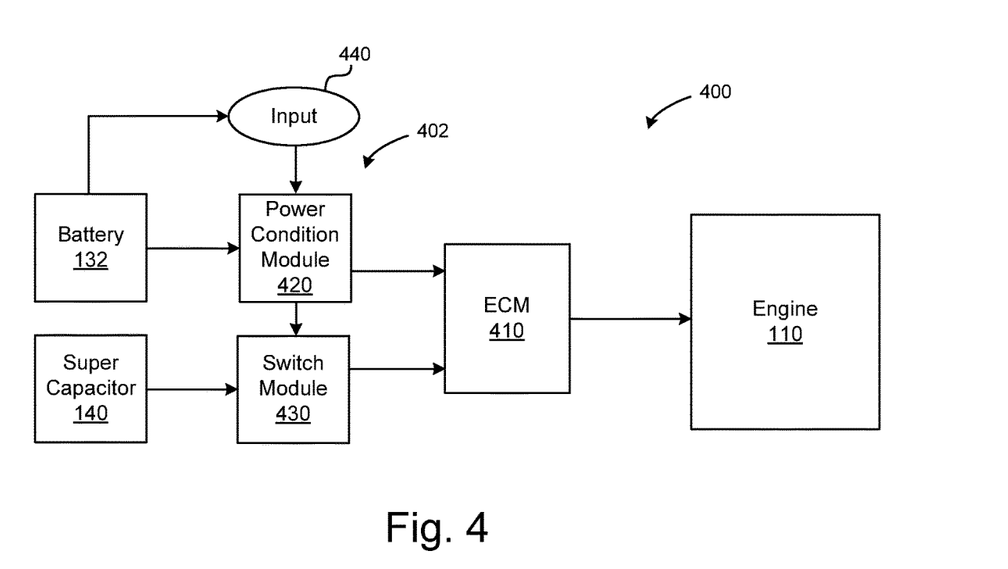
FIG. 4 is a schematic block diagram of an internal combustion engine system having an internal combustion engine and an electrical power management system with a supercapacitor, power condition module, and switch module in accordance with another embodiment.

Referring to FIG. 4, according to one embodiment, an internal combustion engine system 400 includes an engine 110, an ECM 410, and an electrical power management system 402. The electrical power management system 402 manages the delivery of electrical power to the ECM 410. Electrical power is selectively delivered to the ECM 410 from a battery 132 of the system 302, a supercapacitor 140 of the system 302, or both.

The battery 132 is coupled to a power condition module 420 of the electrical power management system 402. The power condition module 420 is configured to determine a condition or power storage capability of the battery 132. In certain implementations, the power condition module 420 receives input 440. The input 440 may be output values from virtual and/or physical sensors that detect one or more sensed characteristics of the battery 132. Additionally, or alternatively, the input 440 may be the status of a battery disconnect switch (not shown). Based on the input 440, the power condition module 420 determines a condition or status of the battery 132 and determines whether to electrically couple the battery 132 to the ECM 410 (e.g., via a physical switch). For example, if the condition of the battery is significantly degraded, or the battery disconnect switch has been activated, the power condition module 420 may electrically decouple the battery 132 and the ECM 410.

The supercapacitor 140 is electrically coupled with a switch module 430 of the electrical power management system 402. The switch module 430 includes a physical switch. The switch module 430 is operable to actuate the physical switch to close an electrical circuit and allow electrical power providing communication between the supercapacitor 140 and the ECM 410. In some implementations, the switch module 430 actuates the physical switch based on input received from the power condition module 420. The input from the power condition module 420 may include the current condition or status of the battery 132 or operating condition of the engine system 400 determined by the power condition module 420.

In one implementation, the input from the power condition module 420 includes the storage capacity or storage level of the battery 132 determined by the power condition module 420. The switch module 430 is configured to electrically couple the supercapacitor 140 and the ECM 410 if a storage condition of the battery 132 falls below a threshold value. The threshold value may be associated with an estimation of the electrical power needs of the engine system 400 based on operating conditions of the engine system. In other words, should the battery 132 fail or come close to failing to provide sufficient electrical power to power the ECM 410, the switch module 430 electrically couples the supercapacitor 140 and the ECM such that power to the ECM 410 is not interrupted or likely to be interrupted. By mitigating or preventing power supply interruptions to the ECM 410, the loss of data saved on the ECM and/or the loss of controls for operation of the engine system 400 is mitigated or prevented.

In another implementation, the input from the power condition module 420 may be the status of a battery kill switch. If the status of the battery kill switch is active, the switch module 430 electrically couples the supercapacitor 140 and the ECM 410 such that power to the ECM 410 is not interrupted or likely to be interrupted.

Figure 5:
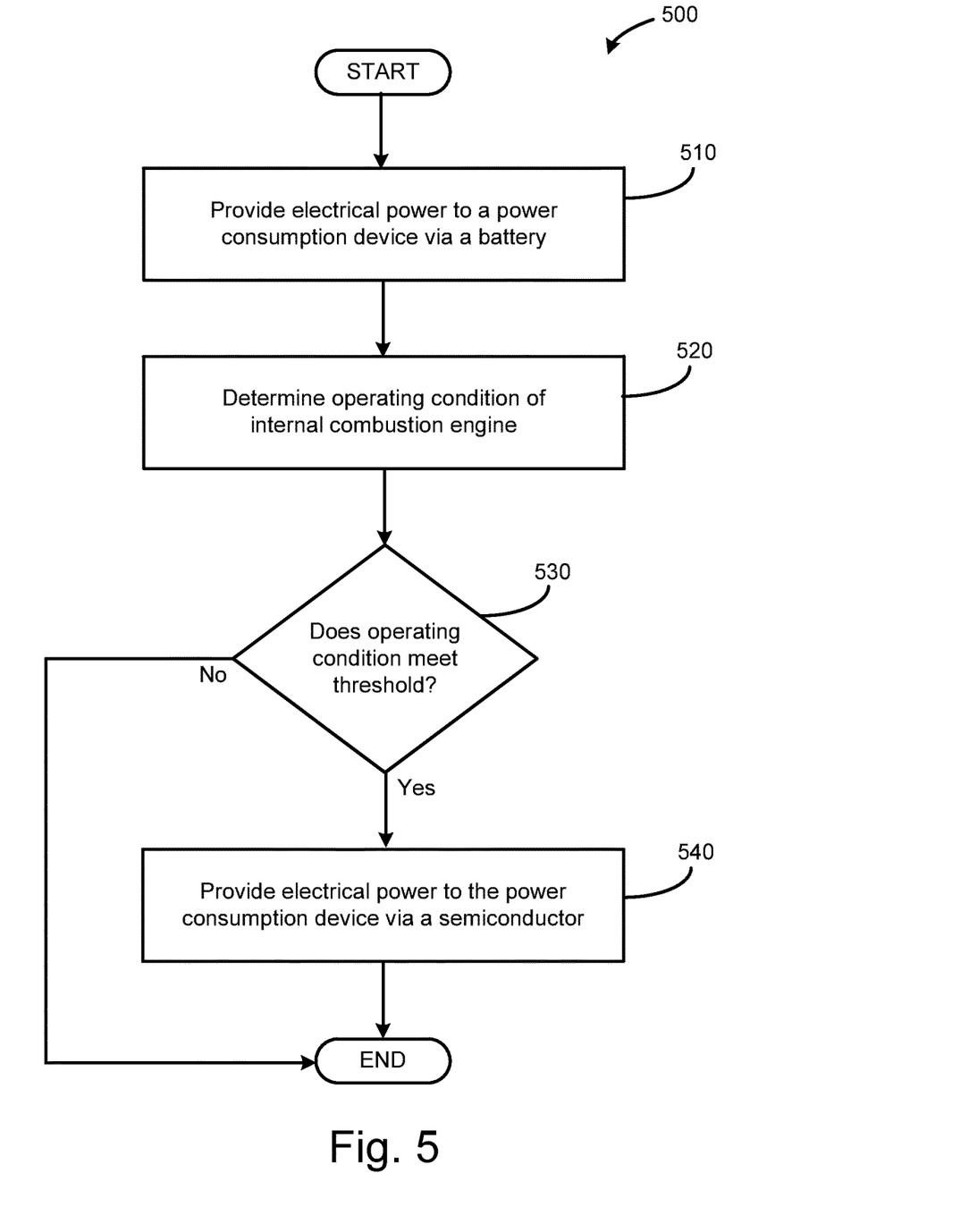
FIG. 5 is a schematic flow chart diagram of a method for managing the electrical power within an internal combustion engine system in accordance with one representative embodiment.

Referring to FIG. 5, a method 500 for managing the electrical power within an internal combustion engine system is shown according to one embodiment. The steps of the method 500 can be executed by one or more of the components or modules of the engine systems described above in certain implementations. The method 500 begins by providing electrical power to a power consumption device via a battery at 510. The power consumption device can be an ECM, starter motor, and/or other device. Further, the battery can be an automotive battery dedicated for providing electrical power to components of the engines system. The method 500 further includes determining operating conditions of the internal combustion engine system at 520. The operating conditions can include any of various operating conditions, such as power storage conditions of the battery, status of a battery kill switch, activation of a starter motor, and the like. If the operating conditions do not meet an associated threshold (e.g., minimum threshold) at 530, then the method 500 ends. However, if the operating conditions meet the associated threshold at 530, then the method 500 proceeds to provide electrical power to the power consumption device via a supercapacitor at 540. In other words, when the battery will not or may not provide enough electrical power to operate the power consumption device (e.g., power storage condition falls below minimum threshold, battery kill switch is activated, starter motor is activated, etc.), the method 500 replaces or supplements the power from the battery with power from a supercapacitor to ensure power to the electrical power device is sufficient and uninterrupted.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An electrical power management system for an internal combustion engine system that has a power consumption device, comprising:
a battery coupleable in electrical power providing communication with the power consumption device;
a supercapacitor coupleable in electrical power providing communication with the power consumption device; and
a power arbitration module configured to receive electrical power from the battery and the supercapacitor, and provide the electrical power from one or both of the battery and the supercapacitor to the power consumption device;
wherein the power arbitration module is configured to maintain providing electrical power from the battery to the power consumption device until a storage capacity of the battery is below a predefined threshold value, wherein in response to the storage capacity of the battery being below the predefined threshold value, the power arbitration module is configured to disconnect the battery from being able to provide electrical power to the power consumption device and only provide electrical power to the power consumption device from the supercapacitor.

2. The electrical power management system of claim 1, wherein the power arbitration module selectively provides electrical power to the power consumption device from only the supercapacitor based on a condition of the battery.

3. The electrical power management system of claim 1, further comprising a battery disconnect switch, wherein the power arbitration module selectively provides electrical power to the power consumption device from only the supercapacitor when the battery disconnect switch is activated.

4. The electrical power management system of claim 1, wherein the power arbitration module selectively provides electrical power to the power consumption device from only the supercapacitor during an engine cranking event of the internal combustion engine.

5. The electrical power management system of claim 1, wherein the power arbitration module selectively provides electrical power to the power consumption device from both the battery and the supercapacitor during an engine cranking event of the internal combustion engine.

6. The electrical power management system of claim 1, further comprising a recharger that selectively provides electrical power to the supercapacitor, the recharger being separate from the battery.

7. The electrical power management system of claim 1, wherein the power consumption device comprises an engine control module.

8. The electrical power management system of claim 7, further comprising a switch module that receives power from the supercapacitor and a power condition module that receives power from the battery, the switch module is configured to selectively transmit power from the supercapacitor to the engine control module based on a condition of the battery determined by the power condition module.

9. The electrical power management system of claim 8, wherein the power condition module is configured to selectively transmit power from the battery to the engine control module.

10. The electrical power management system of claim 1, wherein the power consumption device comprises a starter motor, and wherein the supercapacitor is selectively coupled in electrical power providing communication with the starter motor during an engine cranking event of the internal combustion engine.

11. The electrical power management system of claim 1, wherein the battery and supercapacitor are in parallel.

12. The electrical power management system of claim 1, wherein the battery is not in electrical power receiving communication with another component of the internal combustion engine system.

13. An internal combustion engine system, comprising:
an internal combustion engine;
a power consumption device coupled to the internal combustion engine;
a battery selectively or non-selectively electrically coupled to the power consumption device;
a supercapacitor selectively electrically coupled to the power consumption device, the supercapacitor being in parallel with the battery; and
a power arbitration module configured to receive electrical power from the battery and the supercapacitor, and provide the electrical power from one or both of the battery and the supercapacitor to the power consumption device;
wherein the power arbitration module is configured to maintain providing electrical power from the battery to the power consumption device until a storage capacity of the battery is below a predefined threshold value, wherein in response to the storage capacity of the battery being below the predefined threshold value, the power arbitration module is configured to disconnect the battery from being able to provide electrical power to the power consumption device and only provide electrical power to the power consumption device from the supercapacitor.

14. The internal combustion engine system of claim 13, further comprising a switch module, the supercapacitor being selectively electrically coupled to the power consumption device via the switch module, wherein the switch module electrically couples the supercapacitor to the power consumption device during a power loss event and electrically decouples the supercapacitor from the power consumption device when a power loss event is not occurring.

15. A method for managing the electrical power within an internal combustion engine system, comprising:
providing electrical power to a power consumption device of the internal combustion engine system via a battery;
selectively providing electrical power to the power consumption device of the internal combustion engine system via a supercapacitor in parallel with the battery; and
continuing to provide electrical power from the battery to the power consumption device until a storage capacity of the battery is below a predefined threshold value, wherein in response to the storage capacity of the battery being below the predefined threshold value, disconnecting the battery from being able to provide electrical power to the power consumption device and only providing electrical power to the power consumption device from the supercapacitor.

16. The method of claim 15, further comprising selectively switching between providing electrical power to the power consumption device of the internal combustion engine system via the battery and providing electrical power to the power consumption device of the internal combustion engine system via the supercapacitor based on an operating condition of the internal combustion engine system.

\* \* \* \* \*